Dec. 21, 1965 W. C. DERSCH 3,225,141

SOUND ANALYZING SYSTEM

Filed July 2, 1962 5 Sheets-Sheet 1

INVENTOR.
WILLIAM C. DERSCH
BY
Fraser and Bogucki
ATTORNEYS (a) (b)

United States Patent Office 3,225,141
Patented Dec. 21, 1965

3,225,141

SOUND ANALYZING SYSTEM

William C. Dersch, Los Gatos, Calif., assignor to International Business Machines Corporation, New York, N.Y., a corporation of New York Filed July 2, 1962, Ser. No. 206,818
11 Claims. (Cl. 179—1)

This invention relates to systems and circuits for the analysis and identification of sound, and more particularly to systems for recognizing spoken words and digits. This application is a continuation-in-part of my previously filed application dated November 14, 1961, Serial No. 152,305, and entitled, "Sound Analyzing System," now abandoned.

Word recognition systems which are responsive to human speech are not currently used in practical applications, primarily because they are not sufficiently reliable. However, if sufficient reliability can be obtained, the possibilities of these devices are virtually endless even with limited vocabulary devices. Consider, for example, the many instances in which a person who is fully occupied with certain complex activities must perform additional physical acts which distract from or interrupt the sequence of his other duties. As one illustration, the pilot of a modern high speed aircraft has a great many duties from which he must sometimes divert his attention to carry out routine functions which could much better be handled by spoken commands. In a wholly different context, a cash register operator is often required to sort through many items while concurrently entering the prices of the items on the cash register. Very often the operator simultaneously calls out prices, so that this operation would be performed much more rapidly and probably more accurately with the aid of a spoken word recognizer.

The class of applications for word recognizers just described is one in which a person may have to choose between essentially simple alternatives, but without diverting attention from the performance of other tasks. A number of other broad classes of word recognizers may also be identified, within each of which many particular applications and examples may be found.

One example is the entry of data in a form suitable for processing by automatic electronic means. Thus, as an operator reads raw data, corresponding information may be punched into a card or entered in digital form on a paper tape. This does not always require a large vocabulary, inasmuch as in many instances only a relatively few alternatives are available. Consider, for example, the tabulation of votes subsequent to an election. Here there are sometimes only a relatively few choices which must be distinguished. A related function is the recording of commercial transactions or information. A person who is required to take a great many readings, such as a utility meter reader, or a technician who observes the operation of automatic equipment, is often required to record the results of many observations very rapidly. With a spoken digit recognizer, instruments can be scanned very quickly and spoken readings can be converted directly to digital code for subsequent processing. Related also are such functions as the taking of inventory, the entry of production control data, the recordation of phone call information by a telephone switchboard operator and the voice command of digital systems such as certain machine tool systems which are now controlled by punch card machine.

The possibility of accidental operation of these systems provides no material obstacle to their use, because in accordance with the present invention there is adequate vocabulary available to use a special series of pre-conditioning words to eliminate the possibility of accidental operation, and there is also adequate discrimination against extraneous sounds.

Another class of applications for word recognizers involves the use of commands for controlling functions which are to be remotely performed, such as opening garage doors or turning on lights. A related function here is to be found in automatic signalling between separate points. Signalling equipment on one ship may be operated by spoken commands, for example, and a digital recorder on a different ship may likewise be operated by commands spoken by a person who identifies the received signal. Similarly, an operator at the helm of a vessel may call commands to control a display in the engine room of the vessel.

The applications of spoken word recognition systems in safety, emergency and policing systems are virtually endless. Operators of complicated production machines, who might otherwise be subjected to grave dangers because of improper machine actuation, may control their machines verbally while at the same time operating safety mechanisms which assure that no harm will result. In the event of an accident, moreover, a voice recognition control may be used to operate safety or release mechanisms over relatively long distances if need be. Through the use of coded sequences, switch mechanisms may also control access to restricted areas, and provide recorders for watchmen and investigative personnel.

Because voice recognition machines permit freedom from many manual operations, a whole new class of analytical and teaching devices becomes available if reliability problems are overcome. An analyst making a time and motion study, for example, should be able to follow the most complicated work sequences and to provide appropriate records automatically through voice control. A person taking a survey or making some other form of analysis may also make entries by speech alone, and by virtue of this fact do so much more rapidly without losing reliability. Many possibilities are also opened up in the field of teaching, including instructional voice therapy and teaching of the blind.

Attempts which have heretofore been made to simulate or imitate the functioning of the human ear and mind in recognizing spoken words have encountered certain basic difficulties. Many systems have attempted to treat words as a whole, and to establish and identify significant time varying signal patterns for each word to be recognized. It has been found, however, that this type of representation does not sufficiently preserve the more complex variations and therefore does not uniquely identify different words with adequate clarity. Accordingly, more extensive systems have also been developed, these being based primarily upon frequency selective and sensitive techniques which permit a more detailed analysis of the sound energy of the spoken word. Although these systems are often large and complicated, they are still limited in vocabulary, accuracy and reliability, because they cannot readily compensate for variations in individual speech rates, word lengths, speech loudness or pitch. These problems are of course well recognized, and designers of speech recognition machines have in consequence adopted a number of frequency, energy and time segmentation techniques in order to enhance recognition capabilities. The time base problem is particularly difficult, because the variations in lengths of words and in speech rates are apt to involve the greatest variations which are encountered. It has heretofore been attempted to overcome these difficulties by "normalizing" the durations of spoken words to some standard, or by arbitrarily segmenting the words relative to some time base. All of these techniques require a great deal of equipment, but none operate with the reliability which is desired.

A novel and most fruitful technique for word recognition has recently been described in a previously filed application for patent entitled "Sound Analyzing System," Serial No. 79,389, filed December 29, 1960, by William C. Dersch and assigned to the assignee of the present application. In accordance with the technique described in that application, a digital analysis of the electrical signals representative of sound is made in which measurements determine the occurrence of certain highly specific properties, from which "machine syllables" or spoken sound increments are identified. The machine syllables are not divided in accordance with the syllables of the spoken words, but are directly related to a time base which is established by the machine itself and in response to time varying characteristics of a spoken word. By making different and highly precise measurements for specific characteristics during the interval of a spoken word, logically related sequences of spoken sound increments are established which uniquely identify individual spoken words in a selected vocabulary.

As with the previously described application, the present invention is concerned with electrical signal representations generated as a result of the acoustic waves of speech. The systems and circuits previously described utilize particular characteristics of those sounds which originate principally in the vocal chords and which may be termed "voiced" sounds or "voicing," and also other sounds which are formed from the constricted or concussive passage of air and which may be termed "frictional" or "plosive" or "non-voicing" sounds. While the system of the previously filed application is vastly simpler than systems of the prior art, and at the same time more reliable, is also desirable to reduce the component count still further. It is also desirable to provide systems and circuits which extend the capability of the machine syllable technique, and which further the capabilities of systems using this technique for particular applications.

It is therefore an object of the present invention to provide improved systems and circuits for analyzing spoken words.

Another object of the present invention is to provide improved systems and circuits for identifying spoken words of properties in spoken words, which systems and circuits are much simpler and much more economical than the systems of the prior art, but which have sufficient reliability for practical use.

Systems and circuits in accordance with the present invention can reliably identify specific ones out of a predetermined number of spoken words in a particularly economical fashion by utilizing interrelated measurements of specific properties. In a particular example of a system in accordance with the invention, an extremely compact and economical spoken digit recognizer is provided which makes an integrated determination of friction and voicing characteristics in a simple, multiple-function circuit, and which also makes a number of passive vowel identification measurements. The different measurements are so arranged as to provide all of the identification needed for the selected spoken digits. Each of the properties which is identified during the occurrence of a spoken word may be given a specific weight, and the total weight for each word in the vocabulary may be so arranged that each provides a unique signal value or indication.

A feature of the invention is a circuit which combines the functions of identifying voicing or particular vowel characteristics with identification of frictional sounds. A first amplifier stage at which asymmetry characteristics are identified is coupled to provide signals to successive amplifiers and integrating circuits. The frictional components are used to generate voltage spikes which are successively amplified and successively integrated. The two integrated signals are additively combined to provide an indication of the type of friction property which is present in the sound. One of the integrated signals is also additively combined with the output of the first amplifier stage, to indicate friction whenever it occurs.

A voicing and vowel detector circuit in accordance with the invention uses a pair of complementary symmetry transistors having a stabilizing D.C. network connected between the outputs and the inputs of the transistors. Integrating circuits coupled to a common output terminal provide indications of the presence of asymmetry and voicing in the input speech wave by particular voltage excursions at the output terminal. An A.C. phase shift feedback network is also employed which can be adjusted to provide discrimination between particular vowel sounds.

A particularly inexpensive voice recognition system in accordance with the invention provides unique analog signal representations for each word in a given vocabulary. In this system, the occurrence of specific properties in a spoken word generates weighted signal values which are summed together to provide a final output signal.

Another arrangement in accordance with the invention provides a system for recognizing spoken digits and certain instructional commands. This system may employ a time base measurement circuit having a specified time delay, for identifying the duration of a word and providing timing control signals. The system is arranged to operate and control a desk-type adding machine in response to the voiced commands.

A feature of this system is the employment of vowel separating circuits of particular efficiency which respond to different asymmetry characteristics of different types of vowel sounds. Opposite-going polarity components of an input speech wave are separated and individually amplified, then resistively combined by adjustable resistive elements which may be set to different values for each specific relationship which is to be distinguished. In combination with this measurement, a voicing measurement may be employed to discriminate against frictional effects and sounds.

Another feature of the invention is the measurement and identification of plosive sound characteristics through a novel circuit which identifies envelope sub-audio turbulence contained in the plosive sound characteristic. Frequency components below about 10 cycles per second are extracted and applied to a high gain amplifier, the output signal from which accurately identifies the compressional waves typical of plosive sounds.

A better understanding of the invention may be had by reference to the following description, taken in conjunction with the accompanying drawings, in which.

Figures 1, 2:
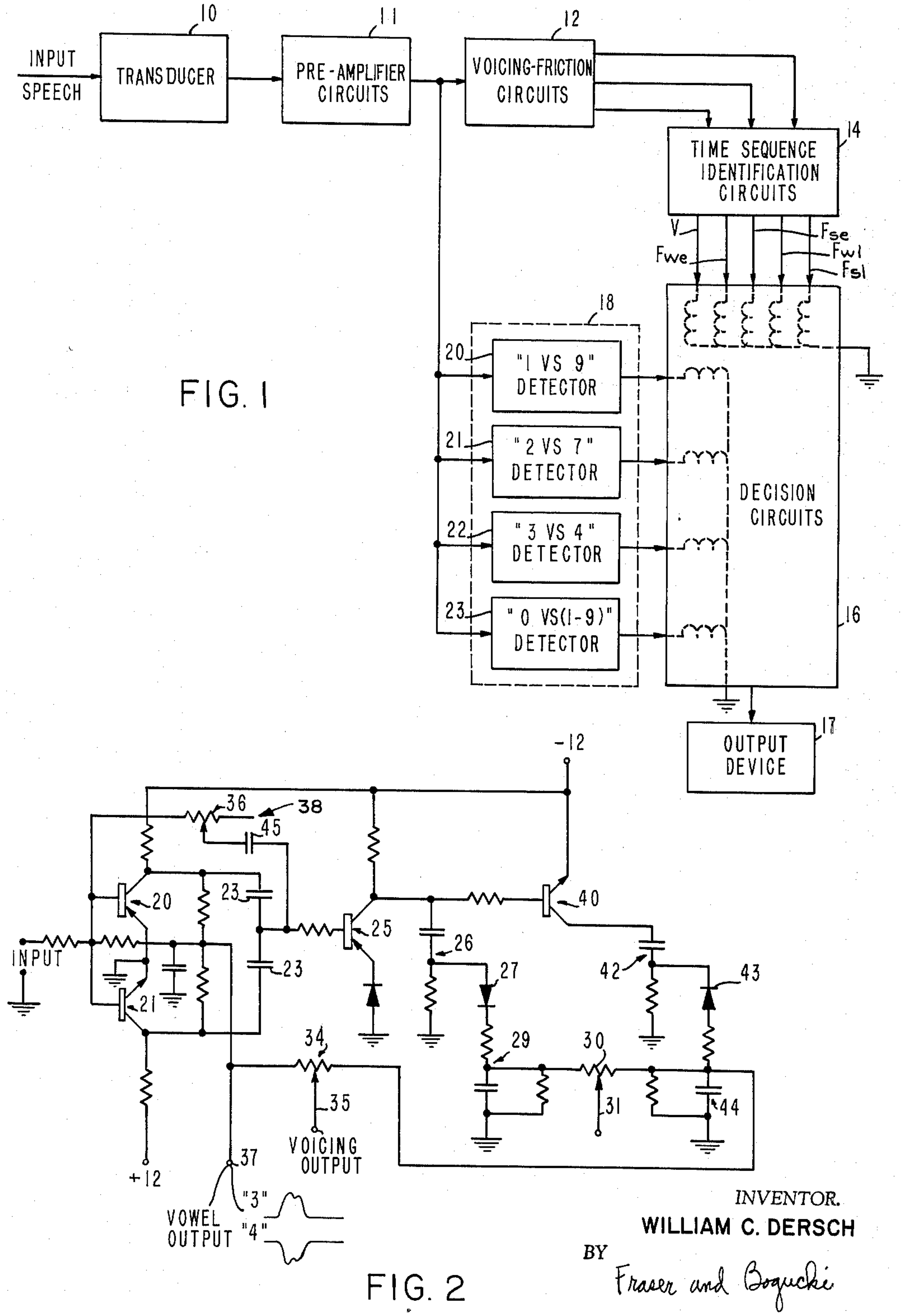
FIG. 1 is a block diagram of a spoken word digit recognizer in accordance with the invention which uses combined voicing-friction circuits, and decision circuits.
FIG. 2 is a schematic circuit diagram of voicing-friction circuits which may be employed in the arrangement of FIG. 1.

Systems in accordance with the invention, referring now to FIG. 1, operate in response to electrical signal representations of the acoustic waves generated as a person speaks. The electrical signal representations have essentially all of the significant information content needed to discriminate different sounds and spoken words and are analyzed directly. The conversion means for the acoustic waves may be a transducer such as a microphone, but it will be recognized that other devices and systems which provide signals representative of speech with adequate fidelity may also be employed. The signals derived from the transducer 10 are amplified in preamplifier circuits 11 and thereafter applied to various property measurement circuits.

In this arrangement, voicing-friction circuits 12 operate in highly integrated fashion to provide indications of the occurrence of voicing, weak friction and strong friction sounds. The distinction between weak and strong frictional sounds results from the contrast between the relatively softly spoken frictional sounds (such as "f," "th" and the like) and the more distinct frictional sounds ("s," for example). A specific example of this circuit is shown in the schematic diagram of FIG. 2, but it should be appreciated that the combinatorial use of elements permits the performance of this complicated sectioning of the properties of words with as few as four active elements but with high reliability.

The three different signal indications which are provided from the voicing-friction circuits 12 may occur in any sequence. These signals are operated on by time sequence identification circuits 14, in accordance with the machine syllable technique, to provide time-related signals which are known as friction weak early ($F_{we}$), friction strong early ($F_{se}$), friction weak late ($F_{wl}$) and friction strong late ($F_{sl}$) signals. Reference may be made to the Dersch application previously referred to for particularly advantageous examples of such an arrangement, but it will be appreciated that many different relay and electronic switching circuits are suitable for providing this function. The different signals provided from the time sequence identification circuits 14 energize relay coils (indicated in phantom only) in decision circuits 16 which control an output device 17. The decision circuits 16 may employ the switching arrangements described in the Dersch application, but further are arranged to provide an analog signal for controlling the indication provided from the output device 17. The decision circuits 16 are also controlled by a group of passive vowel identification circuits 18, each of which energizes a relay coil in the decision circuits 16. These vowel identification circuits include a detector 20 for distinguishing the spoken "1" from the spoken "9" sound by providing a signal only when one or the other is present. This is hereafter referred to as the "1 vs. 9" detector 20. Similarly, there is a "2 vs. 7" detector 21, a "3 vs. 4" detector 22 and a "0 vs. (1–9)" detector 23. In this system, the orally expressed zero is represented by the commonly spoken "oh" sound.

In the operation of this system, the electrical signals which are representative of speech are supplied in parallel to the voicing-friction circuits 12 and the passive vowel identification circuits 18. The time sequence identification circuits 14 identify the time relationship of the various frictional sounds to the voicing sound, while indications are concurrently provided of whether the specified vowel characteristics have been detected. The presence of a strong frictional sound also actuates the weak friction mechanism, but a weak frictional sound does not conversely actuate the strong friction mechanism. The decision circuits 16 distinguish these conditions without requiring the use of separate logic elements. The decision circuits 16 thereafter use digital combinations of values, through signal switching techniques, together with analog values to provide unique output signal amplitudes for actuating the output device 17. The output device 17 may for very simple applications be a current meter having indicia on its face which are arranged to indicate the words which have been spoken.

An example of the voicing-friction circuits 12 of FIG. 1 is shown in detail in FIG. 2. Although a minimum number of components are used, the $F_{se}$ circuits provide reliable indications of the existence of these separate properties. After preamplification, the input signals are applied to the bases of a first transistor 20 of PNP conductivity type and a second transistor 21 of NPN conductivity type. The two transistors 20, 21 are coupled in complementary symmetry fashion. A resistive return coupling from the collector of each of the first and second transistors 20, 21 to the input signal path through a time smoothing network provides a D.C. feedback loop which stabilizes the D.C. coupled complementary symmetry transistors. The output signals from the transistors 20, 21 are A.C. coupled through a pair of direct current blocking capacitors 23 to the base of a third transistor 25, which is of the PNP conductivity type. The output signal derived from the third transistor 25 is applied to a differentiating circuit 26, so that positive-going signal components are passed by an appropriately poled first diode 27. The signal components passed by the first diode 27 are applied to an integrating network 29, to which is also coupled a first potentiometer 30, the movable arm 31 of which constitutes a frictional sound output terminal for the system.

Another output terminal, for voicing signals, is provided by the movable arm 35 of a second potentiometer 34, which is coupled to the midpoint of the D.C. feedback loop between the complementary symmetry transistors 20, 21. An alternate output terminal 37 is provided by a direct coupling to this midpoint, this output terminal 37 providing certain vowel signal indications. When these circuits are used for vowel detection, an A.C. phase shift feedback circuit 38 consisting of a series capacitor 45 and an adjustable resistor 36 is coupled between the A.C. path to the input terminal of the third transistor 25 and the input line to the complementary symmetry transistors 20, 21. When alternate terminal 37, is used, typically the remaining portion of the circuit consisting of transistor 25 and potentiometer 34, and all circuitry serially connected to the right in FIG. 2 is disconnected.

Output signals from the collector of the third transistor 25 are also applied to the base of a fourth transistor 40. As with the third transistor 25, the fourth transistor 40 (here NPN conductivity type) has its collector coupled to a differentiating circuit 42 to which is also coupled a rectifying diode 43 which is poled to pass signals of negative polarity. These signals are summed by an integrating network 44 which is coupled to the first potentiometer 30 and also to the second potentiometer 34.

In this arrangement, only the fourth transistor 40 performs but a single function. All of the remaining active elements contribute directly to the achievement of more than one decisional function. The complementary symmetry amplifier formed by the first and second transistors 20, 21 is stabilized by the D.C. feedback loop and is arranged to use the natural asymmetry inherent in the spoken voicing sounds. The presence of this asymmetry characteristic is disclosed and discussed in a previously filed application for patent of William C. Dersch, entitled "Voiced Sound Detector Circuits and Systems," Serial No. 52,548, filed August 29, 1960 and assigned to the assignee of the present application. Without phase shift, this asymmetry for example will be in each instance in a positive-going direction, so that a positive pulse appearing on the output arm 35 which constitutes the voicing output terminal is an indication of the presence of voicing.

The signal variations at the collector of the fourth transistor 40 are used as indications of the presence of weak frictional sounds. Frictional sounds do not have the asymmetry characteristic, nor do they contain appreciable components at the relatively low frequency periodic variations which characterize the voiced sounds. Instead, frictional sounds are relatively high frequency and noise-like in character, and their polarity reversals or axis crossing densities are much higher than voicing and may be used to thus identify the frictional characteristic. Weak frictional sounds may be distinguished from the strong because they have a lower energy content although they may have as high an axis crossing density.

The spikes of negative polarity which are passed from the differentiating circuit 42 and the diode 43 therefore provide an indication of the axis crossing density, by virtue of the number of differentiated spikes which result from excitation by a given sound. The total area of these pulses is derived from the output signal provided from the integrating circuit 44, the voltage level of which is negative-going because of the polarity of the diode 43. The integrating circuit is coupled back to the second potentiometer 34, so that a negative signal variation at the movable output arm 35 indicates the presence of a frictional sound. The movable arm 35 may be set so as to provide equal and sufficient variations in both the positive and negative-going signals to indicate voicing and frictional sounds respectively.

A measurement is made of the different characteristics of strong frictional and weak frictional sounds by the combined use of the third transistor 25 and the fourth transistor 40 and the associated circuitry. With a strong frictional sound, an appreciable positive-going signal variation is provided at the integrating circuit 29 to which are applied signals from the differentiating circuit 26 and the positive poled diode 27. Because of the subsequent further amplification at the fourth transistor 40, and the like operation of the associated circuits, an even greater negative-going voltage swing will appear at the other integrating circuit 44. The adjustable arm 31 of the first potentiometer 30, however, may be set to provide a positive-going excursion when these two signal variations are summed in the first potentiometer 30. Accordingly, the net variation for a strong frictional sound, such as the "s" sound, is a positive-going variation.

The signal variation appearing at the output arm 31 for a weak frictional sound is negative-going, because the weak frictional sound has insufficient energy to generate an appreciable signal variation at the first integrating circuit 29. After further amplification at the fourth transistor 40, however, an appreciable negative-going swing is experienced in the voltage level at the integrating circuit 44, and consequently in the signal from the output arm 31.

The unique measurements thus far described reliably provide signals to identify voiced as against frictional sounds and strong as against weak frictional sounds. The use of an RC network 38 which constitutes an A.C. phase shift feedback circuit further enables this same system to be able to discriminate between different types of vowels. In general, the phase may be adjusted so that as between any two vowel sounds one vowel sound provides a positive output value while the other provides a negative value. These signal values result solely from the nature of the variation in the asymmetry characteristic with time, typical examples for the spoken digits "3" and "4" being shown.

The manner in which the decision circuits may be arranged is largely a matter of choice, depending upon the speed with which it is desired to operate and the vocabulary which is to be used. Diode matrices or other forms of logical decision circuitry may be employed if desired. In accordance with the present invention, however, it is particularly advantageous to use an intermediate logic which is related to the strong friction and weak friction signals, as references in time to the voicing, as follows (where the "not" condition is indicated by an overline):

$$\overline{F_{we}}\,\overline{F_{se}}=a$$
$$\overline{F_{we}}F_{se}=b$$
$$F_{we}\overline{F_{se}}=c$$
$$\overline{F_{wl}}\,\overline{F_{sl}}=d$$
$$F_{wl}\overline{F_{sl}}=e$$
$$\overline{F_{wl}}F_{sl}=f$$

These *a*, *b*, *c*, *d*, *e*, and *f* signals are combined with the properties identified by the passive vowel detectors and the voicing signal in accordance with the following logic:

| Digit: | Code |
|---|---|
| 1 | $ad\ [\bar{0}-(1-\bar{9})]$. |
| 2 | $bd\ (2-\bar{7})$. |
| 3 | $cd\ (3-\bar{4})$. |
| 4 | $cd\ (\bar{3}-4)$. |
| 5 | $ce$ V. |
| 6 | $bf$ V. |
| 7 | $bd\ (\bar{2}-7)$. |
| 8 | $af$ V. |
| 9 | $ad\ [\bar{0}-(\bar{1}-9)]$. |
| 0 | $ad\ [0-\overline{(1-9)}]$. |

Figure 3:
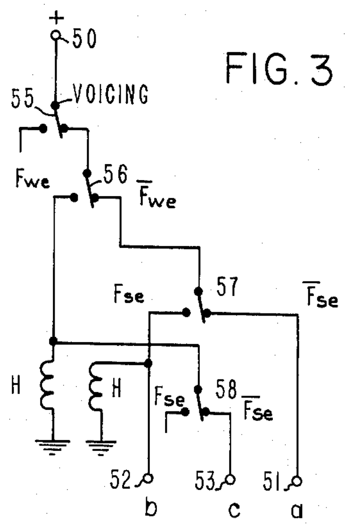
FIG. 3 is a schematic diagram of one exemplary part of decision circuits which may be used in the arrangement of FIG. 1.

An illustrative part of a system for making an initial conversion from the voicing (V), $F_{we}$, $F_{sl}$ and the like signals is shown in FIG. 3 in the form of a relay tree coupled to a positive source 50 and having output terminals 51, 52, 53 designated *a*, *b* and *c* respectively. Four double-pole single-throw relay armatures are shown, these being controlled by the similarly designated relay coils (FIG. 1), which are actuated from the time sequence identification circuits 14. The relay armatures are here called the voicing switch 55, the $F_{we}$ switch 56, the $F_{se}$ switch 57 and the $F_{se}$ switch 58. The voicing switch 55 is connected in circuit with the other switches whenever voicing is found to be present, as is the case with each of the spoken digits in the selected vocabulary. The logical functions provided by the remaining switches 56, 57 and 58 will be seen to correspond to the logic in the above table for the *a*, *b* and *c* conditions. When neither $F_{we}$ nor $F_{se}$ is present the corresponding switches 56, 57 complete a circuit path from the "*a*" terminal 51 through the voicing switch 55 to the source 50. If $F_{se}$ occurs alone, the circuit path is completed through the $F_{se}$ switch 57 to the "*b*" terminal 52. The "*c*" signal is provided only if the $F_{we}$ signal is provided from the $F_{we}$ switch 56 and the second $F_{se}$ switch 58 remains in the $\overline{F}_{se}$ position coupled to the "*c*" terminal 53.

Figure 4:
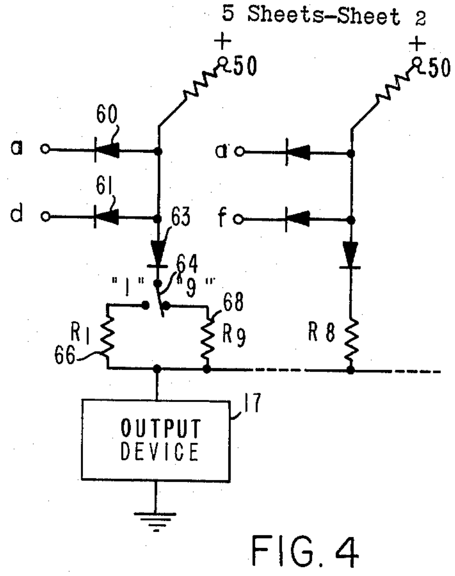
FIG. 4 is a schematic diagram of another exemplary part of decision circuits which may be employed in the arrangement of FIG. 1.

Conversion of these digital values to variable amplitude signals suitable for controlling an output device 17 may be effected as shown in FIG. 4. The circuits shown may be seen to correspond to the logic conditions in the above table for the digits 1, 9 and 8 respectively. In order to provide unique signals for the 1 and 9 conditions, for example, a pair of diodes 60, 61 couple the "*a*" and "*d*" terminals in an "AND" gate arrangement to the voltage source 50. The "AND" gate is also coupled through an isolating diode 63 to a switch 64 which is controlled by the passive vowel identification circuits 18 of FIG. 1.

The "1" designated terminal of the switch 64 is responsive to the operation of the "1 vs. 9" detector 20 and the operation of the "0 vs. (1–9)" detector 23, so as to indicate that the identified word is the 1 and not the 0 or the 9. On application of both the "*a*" and "*d*" signals, therefore, a positive signal from the source 50 passes the switch 64 and is attenuated a selected amount, as determined by the value, represented by $R_1$ or $R_9$, of the coupled resistor 66 or 68, respectively.

Thus, the output device 17 may be uniquely actuated for each of the spoken digits. The one other example which is shown is that for the spoken digit "8," for which no switch is needed. It will be noted that the voicing indication (V) is a prerequisite to the generation of the "*a*" signal in the list above, so that the logic conditions given in the immediately following table are satisfied for the digit "8."

Figure 5:
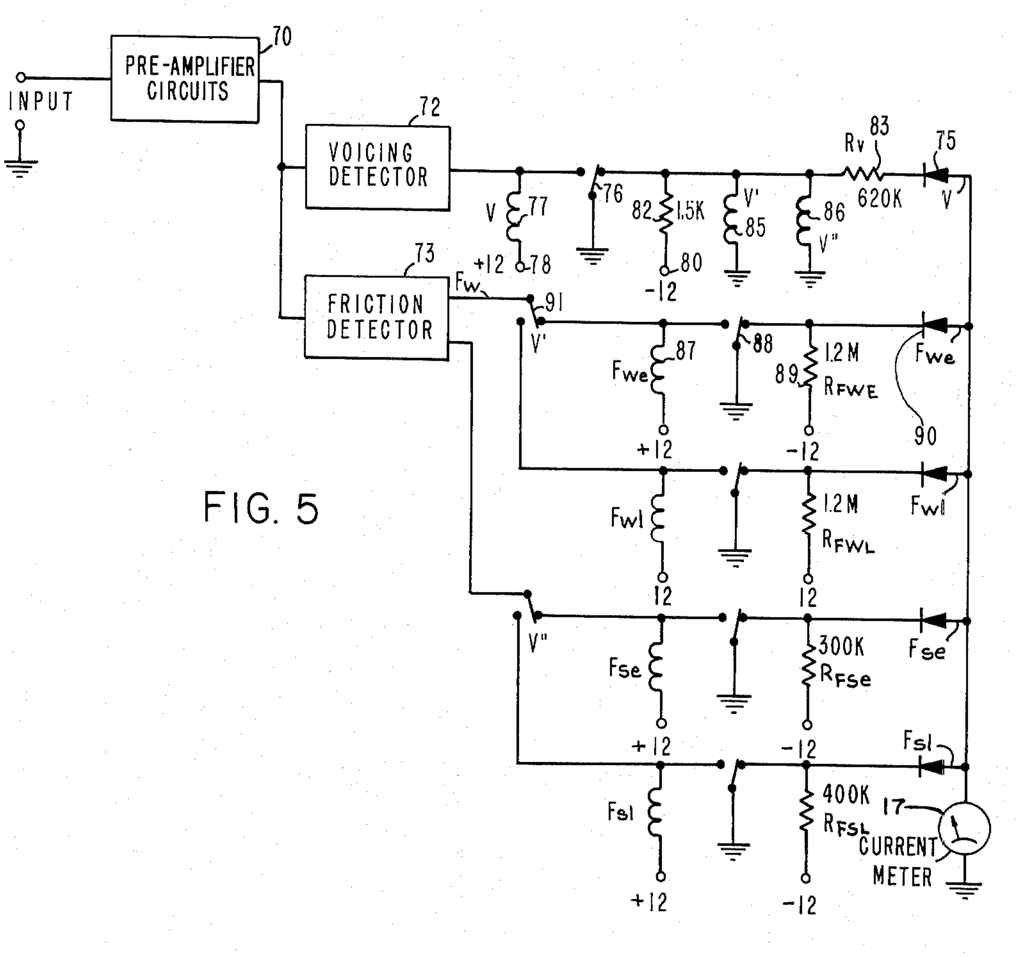
FIG. 5 is a combined block diagram and partial schematic diagram of a different system in accordance with the invention for the recognition of a limited vocabulary of spoken digits.

A particularly simple example of high reliability voice recognition systems in accordance with the present invention is shown in FIG. 5. Although this system provides a lesser vocabulary, it does operate with high reliability and accordingly is useful in many of the applications listed above. Of primary importance, however, is the fact that the system is extremely inexpensive and compact. The active elements in this arrangement consist principally of the preamplifier circuits 70 which couple the input signals representative of speech to a voicing detector 72 and a friction detector 73. The friction detector 73 provides separate indications of the occurrence of weak and strong frictional sounds. The decisional circuitry which is thereafter employed provides weighted indications of the spoken words and digits in the vocabulary directly from the time relation of these different properties.

The voicing signals, weak frictional and strong frictional signals are directed separately into different signal channels which are coupled together at a common circuit junction to an output device 17, which is here a current meter. The weak frictional and strong frictional channels are further subdivided, respectively, into $F_{wl}$, $F_{we}$ and $F_{sl}$, $F_{se}$ subchannels. The operative sequences at each of the channels are broadly alike, and may be understood in the light of the voicing signal channel. Here a circuit to the common junction through an isolating diode 75 is normally coupled to ground from one pole of a relay armature 76 which is controlled by an energizing coil (V) 77 coupled to a source 78. The connection to ground diverts current from a −12 volt source 80 which is also coupled to the common junction through a pair of resistors 82, 83 which are connected in series through the isolating diode 75. When the armature 76 of the relay is switched to the other pole, as the result of a voicing signal which energizes the coil 77, the ground coupling is disconnected and a pair of additional coils designated V′ and V″ 85, 86, respectively, are energized. A potential level established by the −12 volt source 80, attenuated a determinable amount by the resistors 82, 83, is thereupon applied to the common terminal, and a corresponding current contribution appears at the meter device 17.

The interconnections between this channel and the other channels establish the time sequence of the different properties of a word, and further contribute other predetermined current levels to the output device. Considering the $F_{we}$ subchannel, for example, energization of the V′ coil 85 subsequent to actuation of the $F_{we}$ coil 87 does not affect the disconnection of the ground coupling at the armature 88, because this has already taken place. Therefore a specific current flow determined by the value of the resistor 89 is applied to the common terminal through the isolating diode 90. If the voicing indication is provided prior to any friction indication, the V′ armature 91 is shifted to the opposite pole, where it is held while determination is made of whether the $F_{wl}$ signal is to be provided. The arrangements of the other channels and subchannels correspond, with the exception that different values of attenuating resistors are employed, in accordance with the following schedule:

$F_{we}$—1 unit; $F_{wl}$—1 unit; $F_{se}$—3 units;
$F_{sl}$—4 units; V—1 unit.

Through the use of the machine syllable technique and the intercoupling of the time sequence circuitry with the weighting value resistors, a vocabulary of seven different words, including five spoken digits and two additional words, may be indicated with a high degree of reliability with equipment which is far simpler than has heretofore been deemed possible. Unique indications are given for the following words, in accordance with the number of units of current designated:

| Words: | Units of current |
|---|---|
| 1 | 1 |
| 4 | 2 |
| 5 | 3 |
| 6 | 10 |
| 7 | 5 |
| ace | 6 |
| phase | 7 |

Important features of this system which should be noted are the fact that the resistive elements may be coupled to a common potential supply which may be closely regulated if the system is extended to any great extent, and that if precision resistors are used much finer increments of current amplitude may be employed.

Figure 6:
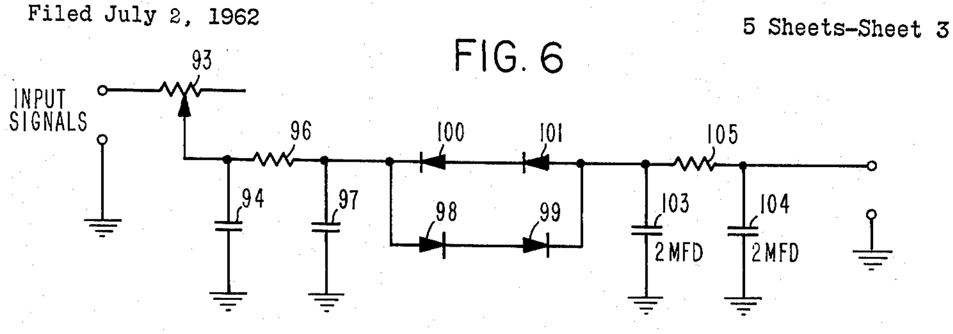
FIG. 6 is a schematic diagram of a vowel detector circuit which may be used in voice recognition systems.

Accurate and reliable detection of specific vowel characteristics can be extremely important to any speech recognition system. An example is the separation of the spoken "2" from the spoken "7." The circuit shown in FIG. 6 is entirely passive, but provides a high power output signal which may be several orders of magnitude greater in power than signals provided by other vowel detectors, and which additionally has extremely good capability for separating the "2" and "7."

Input signals are provided to an RC phase shift network including an adjustable resistor 93 and a capacitor 94. The resistor may have a value from 0 to 50 kilohms depending upon its setting, but the range of 0.1 to 5 kilohms will be typically employed. The RC network may be augmented by a second RC network consisting of a fixed resistor 96 and a capacitor 97, as shown, if desired. Direct coupling of the input signals is provided to two series pairs of diodes 98, 99, 100, 101, the two series pairs being inserted with opposite polarity. The negative-going and positive-going components of the signals which are thus split are applied to a peak charging circuit consisting of a pair of capacitors 103, 104 coupled to an output resistor 105. Individual diodes of each polarity may be used, although with the signal levels usually available in the present example, a series pair appears preferable.

With this arrangement, the RC input networks 93, 94, 96, 97 provide some attenuation of the high frequency components but primarily control phase shift. The output peak charging circuit identifies the asymmetrical components by summing the peaks of the asymmetric voicing signal and storing the result. The circuit has a degree of temperature sensitivity because of the direct coupling from the preamplifier, but provides high energy output signals which readily distinguish between different vowels.

Figure 7:
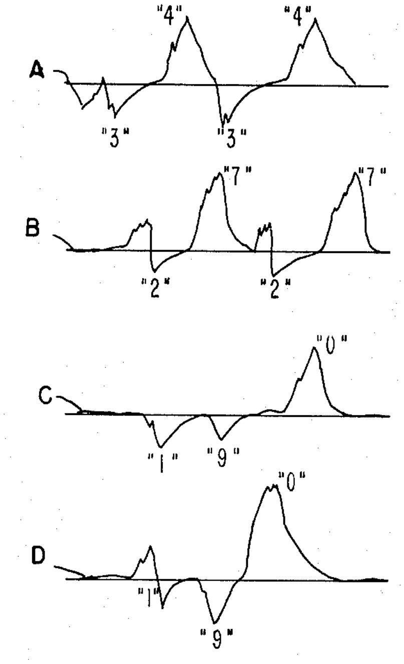
FIG. 7 is a diagram of waveforms arising in operation of the circuit of FIG. 6 under different conditions.

As shown in FIG. 7, a spoken "3" may be distinguished from a spoken "4" because of the generation of peaks of opposite polarity, as shown by waveform A. Similarly, as shown in the next waveform B, the small positive and negative pulse provided from a "2" may be distinguished from the high positive only pulse provided from a "7." With both of these arrangements the settings are substantially the same. With a similar circuit, but with a different value of phase shift, the "1" and the "9" sounds generate negative pulses (waveform C) while the "0" (oh) provides a positive pulse. With a different phase shift, as shown by waveform D, the "1" provides a positive pulse component.

Figure 8:
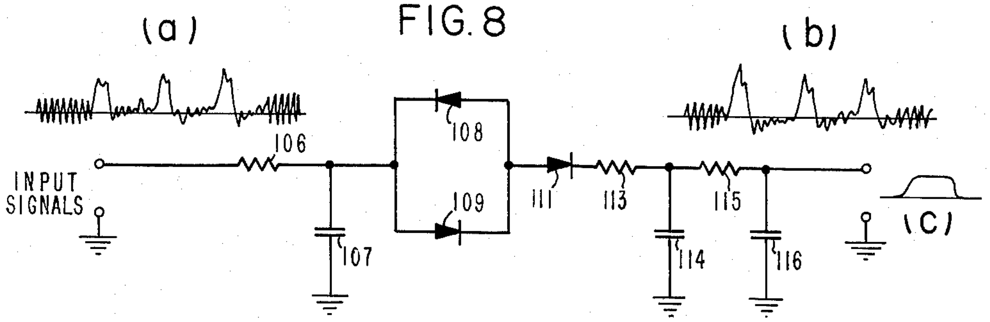
FIG. 8 is a schematic circuit diagram of a voicing detector having particular utility in speech recognition systems.

A different form of voicing detector, which also provides an extremely high power transfer from the input audio signal to the output signal is shown in FIG. 8. Input signals are applied to an RC network 106, 107, the values of the elements of which are chosen to attenuate high frequency components, and also to enhance the asymmetry characteristic of the voicing by proper amounts of phase shift. The values here are chosen to favor the dominant positive-going components, as shown by waveform (a) in FIG. 8. Typical values for this purpose which satisfactorily match typical amplifier and microphone characteristics are about 100 ohms and 1 microfarad. Thereafter the signal is passed through back-to-back diodes 108, 109 which eliminate a good measure of the base line noise and the frictional energy. This signal, which may be represented by waveform (b) in FIG. 8, is applied to a diode 111 which is phased so as to see the asymmetry enhancement. The signal thereafter charges successive RC smoothing circuits 113, 114 and 115, 116 so as to detect the envelope of the signal peaks, as shown by waveform C in FIG. 8, which occurs in the voicing sound.

Internal losses within this circuit are very low, and an appreciable power transfer is effected to the output signal.

It will be recognized that the machine syllable technique is amendable to the addition of a number of other types of property measurement than those heretofore discussed. Such property measurements are seldom truly redundant in speech recognition applications, and as a result may be used to provide further discrimination between like sounds and greatly enlarge the vocabulary which the speech recognition machine may handle.

Figure 9:
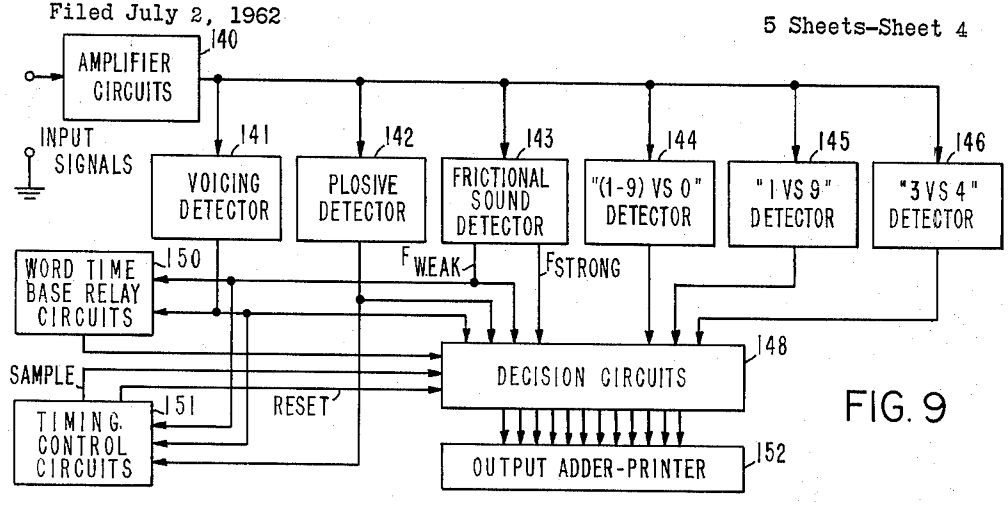
FIG. 9 is a combined block diagram and schematic representation of a different form of spoken digit recognizer representative of speech recognition systems in accordance with the present invention; this system using vowel-voicing measurements, plosive measurements, and time base and decision circuits.

A different system in accordance with the invention, for the direct operation of a printing adder device, is shown in FIG. 9. Input signals representative of speech are applied to amplifier circuits 140 which drive a number of different detector circuits concurrently, including a voicing detector 141, a plosive detector 142, a frictional sound detector 143, a "(1–9) vs. 0" vowel detector 144, a "1 vs. 9" vowel detector 145 and a "3 vs. 4" vowel detector 146. The frictional sound detector 143 is coupled to provide indications of weak frictional and strong frictional sounds on separate output terminals with the weak indication being provided whenever the strong appears.

The vocabulary of this machine consists of the ten digits 1 through 0, using the "oh" sound for zero, plus six control words, consisting of "plus," "minus," "total," "false," "subtotal" and "off." The identification of the spoken words and the provision of corresponding signals for the control of an output device are effected by decision circuits 148 under the control of the various detectors 141–146. Additionally, however, the occurrence of some form of speech activity, and the termination points of spoken digits or words are monitored by word time base relay circuits 150 and timing control circuits 151. The former circuits 150 respond to the voicing and frictional sound indications to provide a control signal to alert the decision circuits 148 to mark the start of a new spoken word. The timing control circuits 151 govern the operative sequence which is used when a word has terminated and may be printed out.

The timing control circuits 151 are continually supplied with the voicing, weak friction and the plosive indications, and include a time delay feature which effectively "waits" until a specified interval (about 75–100 milliseconds) after the termination of the last occurrence of these properties in a sequence. Thereafter, the timing control circuits 151 signal to the decision circuits 148 to govern transfer of the information from latched relay logic blocks in the decision circuits 148 to the solenoids of an output adder-printer 152. As soon as this sampling has been effected, the adder-printer 152 begins its operative cycle, and the timing control circuits 151 then provide a reset signal to the logic relays of the decision circuits 148 so as to prepare for the next word.

The various word commands previously indicated are here used for control of the adder-printer 152 and of the output indications which result. Addition, substraction and totalling are manipulated by the corresponding commands, with the "false" command being coupled to control the printer 152 so as to cause it to recycle and cancel the last entry. The command words "subtotal" and "off" are available for additional appropriate computations.

Figures 10, 11:
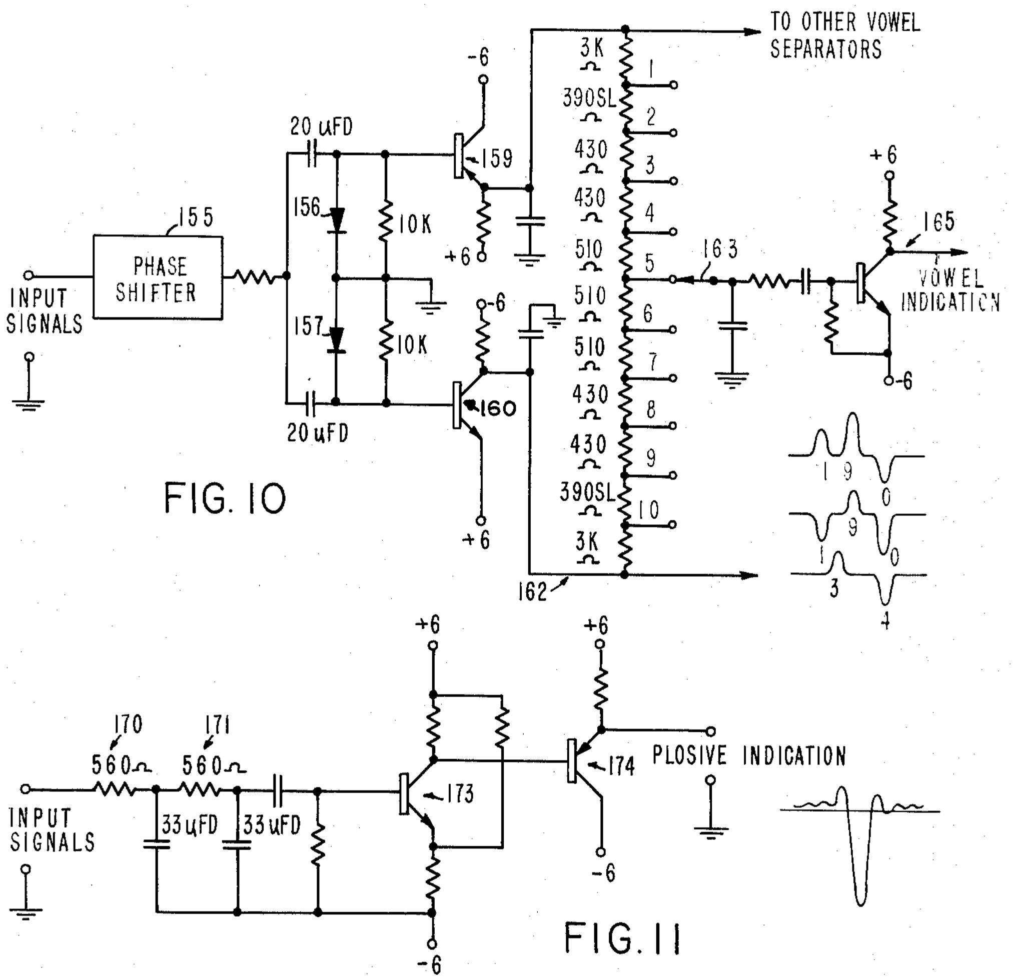
FIG. 10 is a schematic diagram of one example of vowel and voicing measurement circuits which may be used in the arrangement of FIG. 9.
FIG. 11 is a schematic circuit diagram of plosive measurement circuits which may be employed in the arrangement of FIG. 9.

A simple but highly reliable circuit which may be employed for the detection of voicing, and also for the identification of different vowels, is shown in FIG. 10. This circuit employs a controlled phase shift of the input signal together with a marked increase of the input time constant and a balanced adjustment of the output signal. These features enable voicing and specific vowel characteristics to be identified most readily through unique signal excursions.

The input signals representative of speech are applied through a phase shifter 155 to a pair of signal channels having like characteristics. In each signal channel a diode clamp 156, 157 is used to remove signal components of a specific polarity, the diodes being oppositely poled as between the two channels. Negative-going components are applied to the base of a PNP emitter follower transistor 159, while the positive-going components in the opposite channel are applied to the base of an NPN emitter follower transistor 160. The transistors 159, 160 are provided with like biases and selected to have like characteristics so as to maintain symmetry of operation.

For separation of different vowel sounds, a number of voltage dividers 162 (only one being shown) may be coupled in parallel across the emitters of the transistors 159, 160. The resistors in the voltage dividers 162 need not be of equal magnitude, but as shown may vary symmetrically in slowly diminishing fashion about a central value. A movable arm 163 coupled to tap the voltage divider 162 at a selectable intermediate point provides the only adjustment which is needed for a specific vowel indication. An output amplifier 165 may be coupled to drive the subsequent decisional circuitry.

For separation of each pair or set of vowel characteristics, therefore, the arm 163 is placed at a determinable point on its associated divider 162. Opposite-going output signals then appear at the coupled output terminal as shown by the representative waveforms. This circuit will also operate satisfactorily for many purposes without input phase control depending on microphone and amplifier characteristics.

The circuit of FIG. 10 serves as a voicing indicator if the arm 163 is used at the center tap position. In addition, for voicing applications using amplifiers such as 165 it is desirable to establish shorter time constants with the shunt input capacitors. The central position of the arm 163 prevents frictional sounds from passing through this circuit and the asymmetry arising in the voicing is identified by the resultant voltage swing, which is always in the same direction.

For the majority of vowel identifications, however, longer time constants are employed ahead of the envelope demodulator. The longer signal averaging contributes significantly to accuracy by integrating the output noise spikes that would otherwise tend to appear on the envelopes.

Measurement of plosive sounds, such as "t" in the word "two" has been recognized in speech recognition work to present difficult problems. While the plosive sound does contain a short burst of high frequency energy which may be identified by the use of a high pass filter, the arrangement shown in FIG. 11 is preferred. Here a pair of passive input networks 170, 171 constitute a low pass filter of approximately 10 cycles. After filtering, the signal is coupled to a high gain transistor amplifier 173 which may be followed by another amplifier stage 174.

A reliable indication of the plosive sound is provided because such sounds have a slow-varying subaudio frequency component which may be considered as compressional waves which are abruptly released as the plosive sound is generated. This characteristic, which may be referred to as envelope subaudio turbulence, is definitive of the plosive sounds, and more readily detected by the circuit of FIG. 11 than by the circuits heretofore available. At the subaudio frequencies, which are passed by conventional standard microphones apparently as a low frequency modulation, a narrow negative-going excursion appears (as shown) from the "t" sound. The relatively short duration of this negative excursion further separates it from the slowly changing envelope structure output for the other measurements, sometimes appearing in the "th" in "three."

Figure 12:
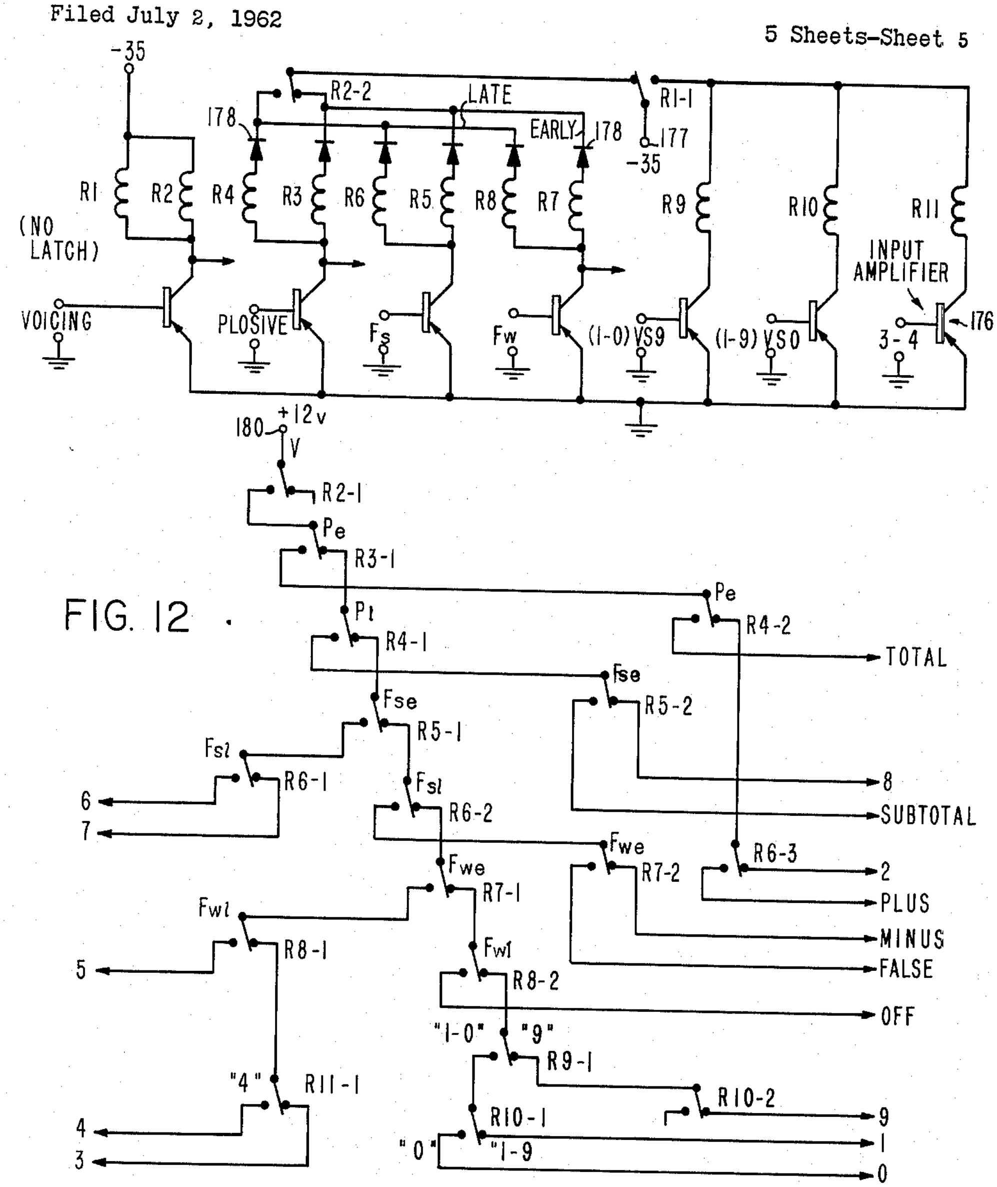
FIG. 12 is a schematic circuit diagram of timing and decision circuitry which may be employed in the arrangement of FIG. 9.

Economical but effective examples of suitable word time base relay circuits 150 and decision circuits 148 are shown in FIG. 12. These circuits provide unambiguous indications of the various words and digits in the vocabulary, in response to input signals applied at separate input amplifiers 176. Although a relay tree arrangement is shown, a wide variety of other decisional circuits may be used as well. The positions of the switches shown are those maintained when the associated coils are not energized. Because a number of switch arms may be controlled from each coil, each arm is designated accordingly (e.g., R6–2 is the second arm coupled to be controlled by coil R6).

As seen in the upper half of FIG. 12, identification of the machine syllable sequence is effected with reference to the voicing signals. A pair of coils, R1 and R2, are energized by the voicing identification and in turn control energization of other control coils which are grouped in three sets. One set, coils R9–R11, are energizable momentarily along with the voicing, under control of switch arm R1–1. (All relays but R1 are selected to have a conventional self-locking or hold feature (not shown) which is released by the reset signal discussed below.) When R9–R11 are coupled to a voltage source 177 by switch arm R1–1, the concurrent vowel separation measurements are made. Prior to the voicing signal, however, the "early" measurements are stored by energization of selected coils R3, R5 and R7 which are coupled to the source through the normal position of switch arm R2–2 and which are individually coupled to the plosive, $F_s$ and $F_w$ amplifiers 176, respectively. Isolating diodes 178 are also coupled in this circuit to prevent erroneous actuations due to reverse current flow.

After indications of voicing, switch arm R2–2 is coupled to "late" circuits which comprise coils R4, R6 and R8, respectively. Thus, measurements of the plosive, $F_s$ and $F_w$ properties are recorded both before and after the identification of voicing. The switch arms which indicate the time related conditions ($P_e$, $P_l$, $F_{se}$, $F_{we}$, and $F_{wl}$) are shown in the bottom half of FIG. 12. The decisions which are made for each spoken word or digit are best discussed separately and in orderly sequence.

"Total"—This word contains both an early and a late plosive sound ("t") relative to the first voicing present, and is thereby unique in the vocabulary. The voicing (V) switch arm R2–1 completes a circuit from a common +12 volt source 180 through the $P_e$ switch arm R3–1 and the $P_l$ switch arm R4–2 to provide the "total" signal when both R3 and R4 have been energized.

"Subtotal"—This command is distinct in having an early strong frictional sound and a late plosive sound (relative to the first voicing sound, which is all that need be used). From the normal position of the $P_e$ switch arm R3–1, therefore, a signal is provided through the energized positions of the $P_l$ switch arm R4–1 and the $F_{se}$ switch arm R5–2.

"Eight"—No early frictional sound is present in this spoken digit, which otherwise is similar to the machine syllables used for "subtotal." Accordingly, the normal position of the $F_{se}$ switch arm R5–2 under like conditions denotes the absence of an early frictional sound and couples the signal to provide the spoken "eight" indication.

"Two"—The "two" sound is different from all others in the vocabulary which initiate with a plosive, in that the "two" does not have either a frictional or a plosive sound after the voicing. Therefore, the same conditions which identify the word "total," absent the $P_l$ indication as shown by the normal position of R4–2, complete the circuit through the $F_{sl}$ switch arm R6–3 to provide an appropriate output signal.

"Plus"—This sound differs from "two" and "total" for present purposes, by terminating in a strong frictional sound. The "P" sound registers strongly as a plosive. On energization of coil R–6 in response to the $F_{sl}$ condition, therefore, the $F_{sl}$ switch arm R6–3 completes the circuit which uniquely identifies this word from the spoken "two" as well as other words.

"Sic"—The spoken "six" is identifiable because of the concurrence of $F_{se}$ and $F_{sl}$ properties in the absence of plosives. Therefore, the circuit to the designated output terminal is completed through the energized V switch arm R2–1, the normal positions of the $P_e$ switch arm R3–1 and $P_l$ switch arm R4–1 and the actuated positions of the $F_{se}$ switch arm R5–1 and the $F_{sl}$ switch arm R6–1.

"Seven"—Only one difference need be established between the "six" and the "seven" sounds—this difference being the absence of a late frictional sound in "seven." Therefore, the conditions satisfied by "six," except for the normal position of the $F_{sl}$ switch arm R6–1, generate the correct output indication for the "seven."

"Minus"—This word has no initial frictional or plosive sounds and ends in a strong frictional sound. The "m" and "n" sounds do not give rise to frictional or plosive effects. An $F_{sl}$ indication is generated from the terminating "s" sound, completing a circuit through the energized position of the $F_{sl}$ switch arm R6–2 and the normal position of the $F_{we}$ switch arm R7–2.

"False"—The command "false" has the weak frictional "f" sound and the strong frictional "s" sound, but lacks the conditions $P_e$, $P_l$ and $F_{se}$. Switching of the $F_{we}$ switch arm R7–2 under the early frictional signal thus completes the circuit between the "false" output terminal and the +12 volt supply 180.

"Off"—No strong frictional sounds or plosive sounds are present in this word, nor are early weak frictional sounds identifiable. The actuation of the $F_{wl}$ switch arm R8–2 in the presence of voicing alone therefore completes the circuit through the normal positions of the prior switches which causes the "off" signal to be generated.

"Nine"—With the "nine," "one" and "oh" sounds, which do not cause plosive or strong or weak frictional indications, use is made of the vowel separations as established by the R9 and R10 relays. Energization of R9 indicates the presence of "1" or "0" but not "9," while R10 indicates the presence of "1" or "9" but not "0." When the switch arms R9–1 and R10–2 remain in their normal positions and no frictional or plosive sounds are indicated, therefore, the "9" output signal is provided.

"One"—Switch arm R9–1 is energized alone when the "one" vowel identification is made, thus completing the output circuit through the R10–1 switch.

"Oh"—Both switch arms R9–1 and R10–1 are switched into their energized positions on operation of the associated vowel detectors, to provide the "0" signal.

"Five"—An early weak frictional sound (indicated by the $F_{we}$ switch arm R7–1) and a late weak frictional sound (from $F_{wl}$ switch arm R8–1) characterize this sound uniquely in the absence of other frictional or plosive sounds, as determined by the prior switches in the circuit.

"Four"—The basic distinction between the spoken "four" and "three" rests on the vowel separation established by switch arm R11–1, inasmuch as there are no strong frictional sounds, and the "f" and "th" early sounds appear as weak friction to energize the $F_{we}$ switch arm R7–1. No late friction appears in either sound, and actuation of switch arm R11–1 provides the "four" output.

"Three"—The same conditions apply as with the "four," except that switch arm R11–1 remains in its normal position under the "3–4" vowel separation.

Figure 13:
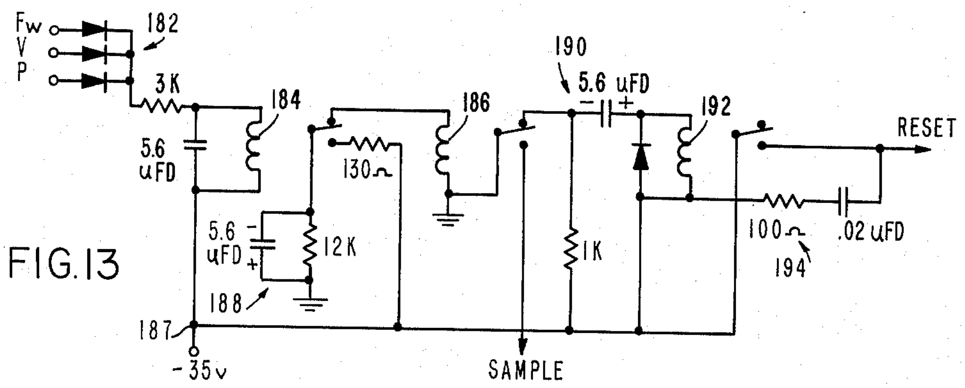
FIG. 13 is a schematic circuit diagram of timing control circuits which may be employed in the arrangement of FIG. 9.

The above control signals completely operate the adder-subtracter in entering and using spoken commands. Four automatic cycling and control, it is further advantageous to use the timing control circuits of FIG. 13. These circuits respond to the presence of speech signals to provide a timed cycle of pulses starting at a given time after a word has ceased. The control signals are the $F_w$, V, and P signals, applied to a pulse generator circuit through isolating diodes 182. In the pulse generator, a first relay coil 184 is energized by any of the control signals, breaking the circuit of a second relay coil 186 which controls a switch coupled to the "sample" output terminal. As long as control pulses arrive with sufficient frequency to maintain the first coil 184 energized, the "sample" output circuit is held boken. At the same time, a —35 volt source 187 is coupled to a storage circuit which is charged to a predetermined level. When the control pulses have ceased, the first relay coil 184 becomes deenergized and the storage circuit 188 is coupled to discharge through the second relay coil 186. The discharge couples the switch to the "sample" output terminal, providing a signal at a predetermined delay (75 to 100 milliseconds) after the end of a word. This is the equivalent of a one-shot multivibrator sequence used for time delay.

On termination of the discharge from the storage circuit 188, the switch disconnects the "sample" output terminal. This, in turn, actuates a second pulse generator circuit which also charges a second storage circuit 190 from the —35 volt source 187. On deenergization of the second relay coil 186, this second storage circuit 190 discharges, energizing a third coil 192 and generating the resultant "reset" output pulse. An electrical surge suppressing network 194 is used in the reset circuit, but the "reset" pulse follows very closely after the "sample" signal.

Thus the "sample" signal automatically controls transfer of the information in the latched relay logic block to the solenoids of the output printer. Immediately thereafter (printer cycling being independent), the reset pulse can reset the logic relays and prepare the system for the next word coming in. Note that the "false" command is applied to cause the printer to cycle and cancel the previous entry. Note also that the word time base circuits have been treated with respect to the interrelated decision circuits in the discussion of FIG. 12, but that all these circuits operate in highly integrated fashion.

The extremely small size and simplicity of voice recognition systems in accordance with the invention provides particular advantages in telephone communications systems. The necessary parts can be mounted directly in the telephone handset, and the needed power can be obtained from that supplied by the telephone system. Adequate fidelity is not obtained with the usual carbon button microphone, however, so this should be replaced by a dynamic microphone and a transistor amplifier stage. This change does not affect normal telephone communications, except to provide superior audio transmission. Where both normal and voice recognition operation are desired a switch should be added to control use of the voice recognition circuits.

When these conventional details are provided, however, the telephone handset becomes a versatile digital data input source when used in conjunction with voice recognition circuits. Data processing over telephone lines is now carried out using tone generators, and time modulation of one tone or combinations of the tones for high speed data transmission. Voice recognition enables the tone generators of such systems to be controlled directly and conveniently. As another example, the signalling needed for entry of a telephone call is particularly simple with all-digit telephone numbers. No manual switch need be used, because the voice control circuits can be activated by a coded command word or words. In like manner the telephone handset may be used as the input source for a wide variety of other digital control application.

While a number of sound analyzing systems and circuits have been described, it will be appreciated that the invention is not limited thereto. Accordingly, the invention should be considered to include all modifications and variations falling within the scope of the appended claims.

What is claimed is:

1. A speech recognition system including the combination of means for identifying frictional characteristic sounds by the axis crossing density thereof, means for identifying voicing characteristic sounds by asymmetry characteristics therein, means responsive to the frictional and voicing identifications for establishing the time relationship of the frictional characteristics relative to the voicing characteristics, and means responsive to the identifications and the established time relationship for representing the occurrence of specific spoken words by variable amplitude signals.

2. A speech recognition system including the combination of means for identifying frictional, voicing and vowel characteristics of speech, means responsive to the frictional and voicing characteristics for establishing the time sequence thereof, a plurality of resistors of predetermined weighted values coupled to a common circuit junction, output indicating means responsive to variable amplitude signals and coupled to the common circuit junction of the resistors, and switching means responsive to the vowel characteristics and to the established time sequence of the frictional and voicing characteristics for providing selective coupling of the means for identifying characteristics to the weighted resistors, such that variably attenuated signals are provided to the output indicating means.

3. A speech recognition system including the combination of means for identifying voicing, strong friction and weak friction characteristics of speech, intercoupled switching means responsive to the strong friction, weak friction and voicing characteristics for establishing signals in five different channels representing the time relation of the frictional characteristics to the voicing, common circuit junction means, a plurality of resistive means, each coupled in a different one of the signal channels and to the common circuit junction means and each having a predetermined assigned value, such that different combinations of the resistors provide unique signal summations at the common circuit junction means, and an output device responsive to the total signal variation at the common circuit junction means.

4. A speech recognition machine including means for indicating voicing, strong frictional and weak frictional characteristics of speech, a group of three signal channels, a first one of which is coupled to receive the voicing indications, a second of which is coupled to receive the weak frictional indications and a third of which is coupled to receive the strong frictional indications, each of the signal channels being coupled to a common circuit junction and including a fixed potential source, and including also resistor means coupling the fixed potential source to the common circuit junction, the value of the resistor means being selected in relation to the values of the other resistor means, and means responsive to the time relation of the frictional characteristics relative to the voicing characteristic for selectively disconnecting the couplings from the channels to the common junction.

5. The invention as set out in claim 4, wherein each of the strong frictional and weak frictional channels includes a pair of subchannels, one of which responds to indicate a late occurrence of the characteristic relative to the voicing and the other of which responds to indicate an early occurrence of the characteristic relative to the voicing, and in which the intercoupling means comprises switching means controlled by the voicing indications.

6. A system for printing and adding under the control of spoken commands including means for identifying the occurrence of specific properties in signals representative of the spoken commands, means responsive to the occurrence of specific ones of the properties for identifying the termination of a spoken command, means responsive to specific ones of the properties for providing timing control signals, decision means responsive to the identification of specific properties, to the termination identifying means and to the timing control signals for providing signals to indicate commands to be printed, and printer means resposive to the signals from the decision means and to the timing control signal.

7. A system controlled by spoken commands including means providing signals representative of the spoken commands, property identification means responsive to the signals, termination identification means responsive to the signals, means responsive to the property identification means for providing timing control signals, and means responsive to the property identification means, the termination identification means and the timing control signals for providing unique indications of the spoken commands.

8. A system for operating an adder-printer under the control of spoken words and including the combination of first means for identifying the presence of voicing characteristics in the speech, second means for identifying the occurrence of frictional characteristics in the speech, third means for identifying the occurrence of plosive characteristics in the speech, fourth means for identifying the occurrence of specific vowel characteristics in the speech, word time base means responsive to the frictional and voicing characteristics and providing indications of the termination of a spoken word, means responsive to the voicing, plosive and frictional characteristics for providing timing signals, decision means responsive to the voicing, plosive, frictional and vowel characteristics, and to the time base means for providing control signals designating specific digits to be printed, and adder-printer means responsive to the control signals and to the timing signals.

9. A system under the control of spoken commands including the combination of first means for identifying the presence of voicing characteristics in the speech, second means for identifying the occurrence of frictional characteristics in the speech, third means responsive to subaudio turbulence components of the speech for identifying the occurrence of plosive characteristics in the speech, fourth means for distinguishing between the occurrence of specific vowel characteristics in the speech, word time base means responsive to the frictional and voicing characteristics in providing indications of the termination of a spoken word, means responsive to the voicing, plosive and frictional characteristics for providing timing signals, and decision means responsive to the voicing, plosive and frictional characteristics and also responsive to the time base for providing control signals designating specific spoken commands.

10. A system for providing control signals in response to a spoken word comprising first means for identifying the presence of voicing characteristics in the speech, second means for identifying the occurrence of frictional characteristics in the speech, third means responsive to low frequency subaudio turbulence components for identifying the occurrence of plosive characteristics in the speech, fourth means for identifying the occurrence of specific vowel characteristics in the speech, and output means coupled to the first, second, third and fourth means and responsive to the time of occurrence of voicing, plosive and frictional characteristics for providing control signals indicative of spoken commands.

11. A system for identifying specific spoken words including first means for identifying the occurrence of voicing characteristics in the speech, second means for identifying the occurrence of frictional characteristics in the speech, third means for identifying the occurrence of specific vowel characteristics in the speech, and fourth means for identifying the occurrence of the "t" sound in the speech, said fourth means being responsive to low frequency subaudio turbulence characteristics less than approximately 10 cycles per second which are characteristic of the "t" sound.

References Cited by the Examiner

UNITED STATES PATENTS

| | | | |
|---|---|---|---|
| 2,969,468 | 1/1961 | Hogue | 307—88.5 |
| 2,996,579 | 8/1961 | Slaymaker | 179—1 |
| 3,020,344 | 2/1962 | Prestigiacomo | 179—1 |
| 3,067,288 | 12/1962 | Kalfaian | 179—1 |

ROBERT H. ROSE, *Primary Examiner.*

WILLIAM C. COOPER, *Examiner.*